United States Patent
McCann et al.

(10) Patent No.: US 9,615,307 B2
(45) Date of Patent: Apr. 4, 2017

(54) SYSTEM AND METHOD FOR MANAGING PREFIXES

(71) Applicant: Futurewei Technologies, Inc., Plano, TX (US)

(72) Inventors: Peter J. McCann, Bridgewater, NJ (US); Kaippallimalil Matthew John, Richardson, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 74 days.

(21) Appl. No.: 14/607,940

(22) Filed: Jan. 28, 2015

(65) Prior Publication Data

US 2015/0223055 A1    Aug. 6, 2015

Related U.S. Application Data

(60) Provisional application No. 61/934,367, filed on Jan. 31, 2014.

(51) Int. Cl.
  *H04W 8/26* (2009.01)
  *H04L 29/12* (2006.01)
  (Continued)

(52) U.S. Cl.
  CPC ............. *H04W 40/02* (2013.01); *H04W 8/26* (2013.01); *H04W 80/04* (2013.01); *H04L 45/04* (2013.01); *H04L 45/12* (2013.01); *H04L 61/2015* (2013.01); *H04L 61/2092* (2013.01); *H04L 61/6068* (2013.01)

(58) Field of Classification Search
  CPC ......... H04W 8/00; H04W 8/26; H04W 24/08; H04W 36/0011; H04W 36/0027; H04W 36/08; H04W 36/12; H04W 36/24; H04W 40/02; H04W 40/246; H04W 40/248; H04W 48/17; H04W 72/085; H04W 76/025; H04W 76/04; H04W 80/04; H04W 80/045; H04W 88/06; H04L 45/04; H04L 45/12;
  (Continued)

(56) References Cited

U.S. PATENT DOCUMENTS 7,085,241 B1 *  8/2006  O'Neill ................... H04L 45/02
                                                  370/254
7,161,929 B1 *  1/2007  O'Neill ............. H04L 29/12216
                                                  370/349

(Continued)

OTHER PUBLICATIONS

International Search Report and Written Opinion of Patent Cooperation Treaty (PCT), International Application No. PCT/US15/13904, Applicant Huawei Technologies, Co., Ltd., date of mailing Apr. 21, 2015, 8 pages.

(Continued)

*Primary Examiner* — Tri H Phan
(74) *Attorney, Agent, or Firm* — Slater Matsil, LLP

(57) ABSTRACT

A method for managing prefixes of a mobile node (MN) includes receiving a servable prefix and a cost associated with the servable prefix from a first router serving the MN, wherein the servable prefix is one of a plurality of prefixes assigned to the MN that is servable by the first router, deciding whether to release the servable prefix through the first router in accordance with the cost associated with the servable prefix, and releasing the servable prefix when the MN has decided to release the servable prefix.

25 Claims, 8 Drawing Sheets

(51) Int. Cl.
*H04W 40/02* (2009.01)
*H04W 80/04* (2009.01)
H04L 12/715 (2013.01)
H04L 12/721 (2013.01)

(58) Field of Classification Search
CPC ............. H04L 61/2015; H04L 61/2084; H04L 61/2092; H04L 61/6004; H04L 61/6068; H04L 29/12
USPC ........ 370/310–350, 395, 400–401, 431, 437, 370/464–465; 455/431–466; 709/220–229
See application file for complete search history.

(56) References Cited

U.S. PATENT DOCUMENTS

| | | | | |
|---|---|---|---|---|
| 7,362,727 | B1* | 4/2008 | O'Neill | H04L 45/02 370/331 |
| 8,289,845 | B1* | 10/2012 | Baldonado | H04L 43/16 370/229 |
| 9,066,328 | B2* | 6/2015 | Zuniga | H04W 8/087 |
| 9,420,498 | B2* | 8/2016 | Zuniga | H04W 8/087 |
| 2005/0265259 | A1 | 12/2005 | Thubert et al. | |
| 2006/0198298 | A1* | 9/2006 | Bhogavilli | H04L 45/00 370/229 |
| 2009/0285215 | A1* | 11/2009 | Kaippallimalil | H04L 29/12028 370/392 |
| 2011/0032874 | A1* | 2/2011 | Kim | H04W 8/08 370/328 |
| 2011/0080853 | A1* | 4/2011 | Thubert | H04L 45/02 370/255 |
| 2013/0028095 | A1 | 1/2013 | Vasseur et al. | |
| 2014/0321328 | A1* | 10/2014 | Zuniga | H04W 8/06 370/254 |
| 2015/0249999 | A1* | 9/2015 | Kaippallimalil | H04W 24/08 370/329 |

OTHER PUBLICATIONS

Bradner, S., "Key words for use in RFCs to Indicate Requirement Levels," Networking Working Group, Best Current Practice, Mar. 1997, pp. 1-3.

Korhonen, J., et al., "IPv6 Prefix Properties draft-korhonen-6man-prefix-properties-02.txt," Distributed Mobility Management (DMM), Standards Track, Jul. 10, 2013, 13 pages.

* cited by examiner

SYSTEM AND METHOD FOR MANAGING PREFIXES

This application claims the benefit of U.S. Provisional Application No. 61/934,367, filed on Jan. 31, 2014, entitled "System and Method for Communicating Prefix Routability to a Mobile Node," which application is hereby incorporated herein by reference.

TECHNICAL FIELD

The present disclosure relates generally to digital communications, and more particularly to a system and method for managing prefixes.

BACKGROUND

In wireless mobile communications, today's mobility management schemes generally make use of a hierarchy of tunnels from a relatively fixed anchor point, through one or more intermediate nodes, to reach a mobile node's (MN's) current point of attachment. These schemes generally suffer from poor performance, poor scalability, and failure modes due to the centralization and statefulness of the anchor point(s). The Distributed Mobility Management (DMM) working group of the IETF is currently chartered to investigate alternative solutions that will provide greater performance, scalability, and robustness through the distribution of mobility anchors.

In a network implementing distributed mobility management, it has been agreed that MNs should exhibit agility in their use of Internet protocol (IP) addresses. That is, an MN should use an old address for ongoing socket connections, and use a new, locally-assigned address for new socket connections.

SUMMARY OF THE DISCLOSURE

Example embodiments of the present disclosure which provide a system and method for managing prefixes.

In accordance with an example embodiment of the present disclosure, a method for managing prefixes of a mobile node (MN) is provided. The method receiving, by the MN, a servable prefix and a cost associated with the servable prefix from a first router serving the MN, wherein the servable prefix is one of a plurality of prefixes assigned to the MN that is servable by the first router. The method also includes deciding, by the MN, whether to release the servable prefix through the first router in accordance with the cost associated with the servable prefix, and releasing, by the MN, the servable prefix when the MN has decided to release the servable prefix.

In accordance with another example embodiment of the present disclosure, a method for managing prefixes of a mobile node (MN) is provided. The method includes retrieving, by a router, prefixes assigned to the MN, and selecting, by the router, a first subset of the prefixes assigned to the MN that are servable by the router, thereby producing servable prefixes. The method also determining, by the router, a cost measure for each of the servable prefixes, wherein the cost measure is an indication of resources used to maintain the servable prefix, and sending, by the router, the servable prefixes and the cost measures to the MN.

In accordance with another example embodiment of the present disclosure, a mobile node (MN) adapted to perform prefix management is provided. The MN includes a processor, and a computer readable storage medium storing programming for execution by the processor. The programming including instructions to receive a servable prefix and a cost associated with the servable prefix from a router serving the MN, wherein the servable prefix is one of a plurality of prefixes assigned to the MN that is servable by the router, decide whether to release the servable prefix through the router in accordance with the cost associated with the servable prefix, and release the servable prefix when the MN has decided to release the servable prefix.

One advantage of an embodiment is that a mobile node is able to make use of cost information regarding prefixes that are redirectable through a current network to evaluate retention or replacement of these prefixes to enable more optimal routes that yield better performance and lower costs.

A further advantage of an embodiment is that the mobile node is able to evaluate the prefixes on a case by case basis and retain only those prefixes when it is beneficial to do so.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to managing prefixes. For example, a mobile node receives a servable prefix and a cost associated with the servable prefix from a first router serving the mobile node, wherein the servable prefix is one of a plurality of prefixes assigned to the mobile node that is servable by the first router. The mobile node also decides whether to release the servable prefix through the first router in accordance with the cost associated with the servable prefix, and releases the servable prefix when the mobile node has decided to release the servable prefix.

The present disclosure will be described with respect to example embodiments in a specific context, namely communications systems that support mobile node (MN) mobility through distributed mobility management (DMM). The disclosure may be applied to standards compliant communications systems, such as those that are compliant with Third Generation Partnership Project (3GPP), IEEE 802.11, IETF, and the like, technical standards, and non-standards compliant communications systems, that support MN mobility through DMM.

Figure 1:
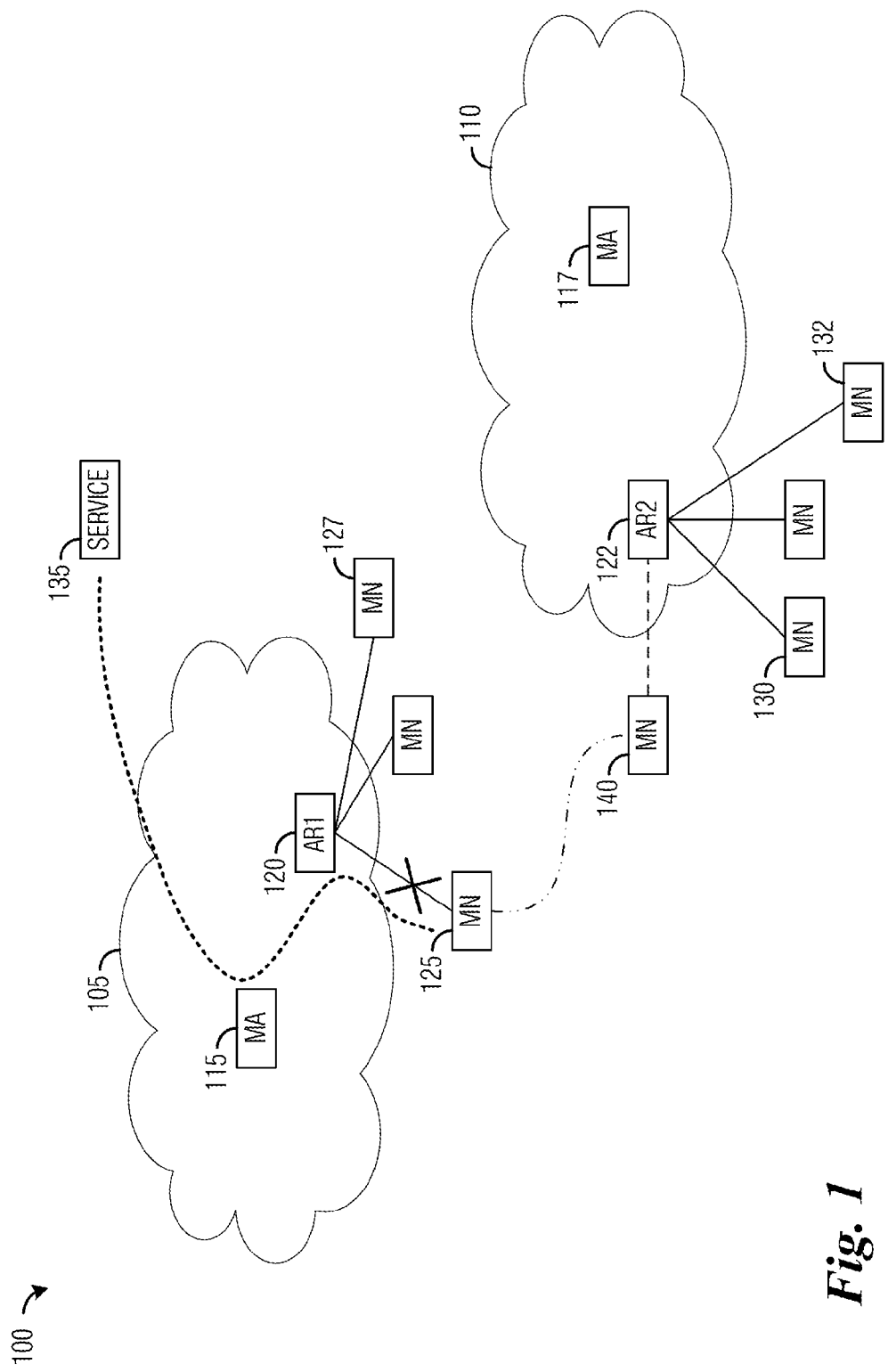
FIG. 1 illustrates an example communications system according to example embodiments described herein.

FIG. 1 illustrates an example communications system 100. As shown in FIG. 1, communications system 100 includes a first network 105 and a second network 110. It is noted that network 105 and network 110 may be different parts of the same network. Each network includes at least one mobility anchor (MA), such as MA 115 and 117, and at least one access router (AR), such as AR1 120 and AR2 122. An AR may support one or more MNs, such as AR 120 supports MN 125 and MN 127, and AR 122 supports MN 130 and MN 132.

A MN may have one or more sessions with a service; exchanging packets with the service via the current AR. As an example, MN 125 may have a session with service 135, and packets exchanged between MN 125 and service 135 may be routed through AR1 120 and MA 115. A session may be identified by an address, which includes a prefix. The session may be referred to by its prefix. In order to send and/or receive packets, a MN may need to be attached to a network. As an illustrative example, MN 125 and service 135 exchange packets via a tunnel.

While it is understood that communications systems may employ multiple networks capable of supporting a number of MNs, only two networks, two MAs, two ARs, and a number of MNs are illustrated for simplicity.

When a MN moves out of range of an access router, in order to maintain connectivity with services, the MN may have to attach to a new access router or a new network. As shown in FIG. 1, MN 125 leaves first network 105 and attaches to second network 110 via AR2 122, where it is shown as MN 140 to prevent confusion. Although the MN has changed networks, pre-existing sessions (prefixes) are maintained through the use of the old prefixes assigned to the pre-existing sessions. Communications system resources are dedicated to sub-optimally routing the packets between the MN and the services, leading to increased costs and inefficiencies. It may be possible for the MN to move so far away from the service that it is no longer possible to maintain the session, leading to the prefix being unservable by the current access router.

Figure 2:
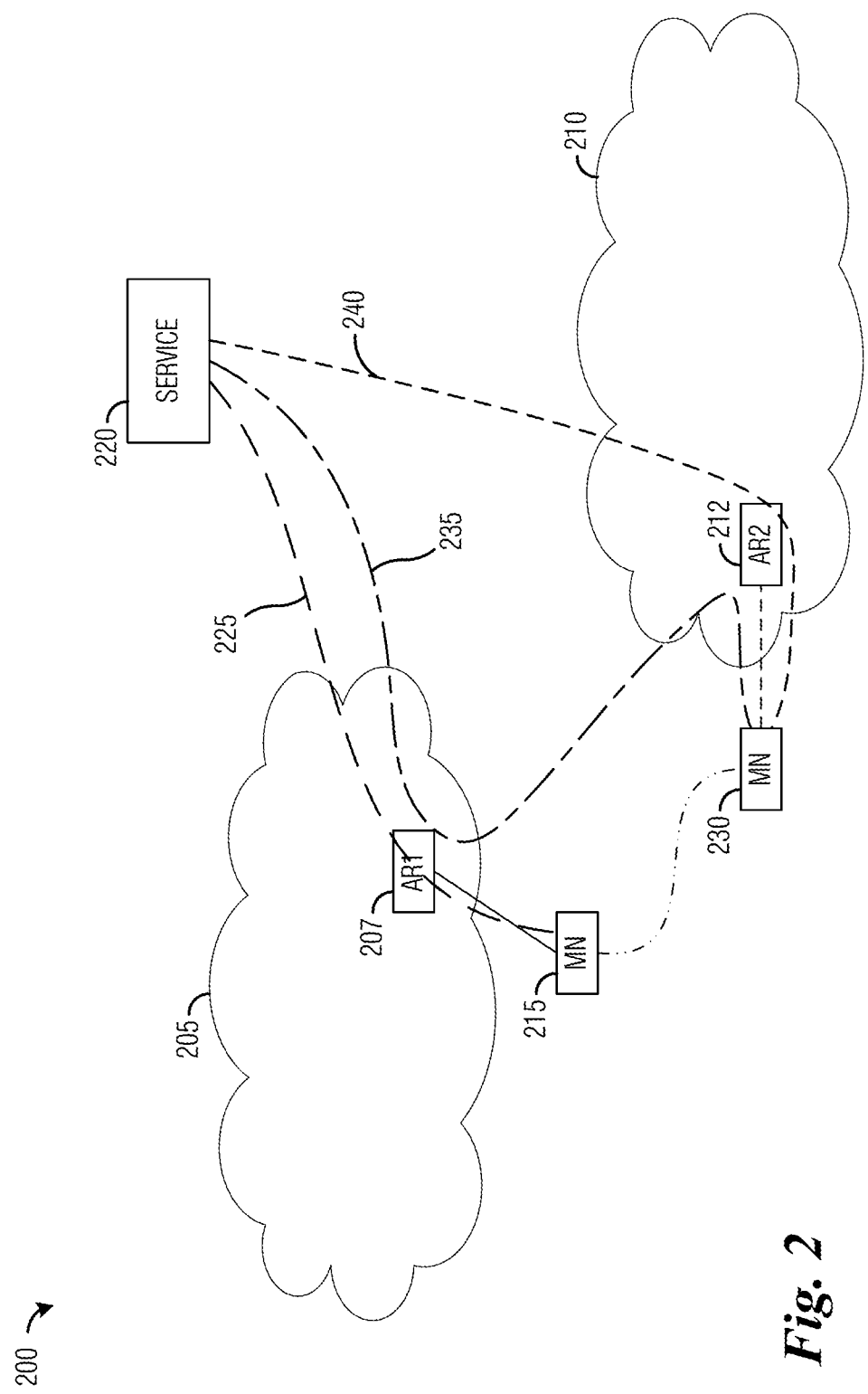
FIG. 2 illustrates an example communications system highlighting session redirection according to example embodiments described herein.

FIG. 2 illustrates an example communications system 200 highlighting session redirection. Communications system 200 includes a first network 205 and a second network 210. First network 205 includes an AR 207, while second network 210 includes AR 212. As shown in FIG. 2, a MN 215 is attached to first network 205 through AR 207. MN 215 and a service 220 are exchanging packets via a session, with the packets following path 225.

As MN 215 moves out of range of access router 207, MN 215 detaches from first network 205 and attaches to second network 210 via access router 212, where it is shown as MN 230 to prevent confusion. The session between MN 215 and service 220 is maintained. However, since MN 215 is no longer attached to first network 205, network resources are used to redirect packets to MN 230. As shown in FIG. 2, packets between MN 230 and service 220 may follow path 235.

Also shown in FIG. 2 is path 240, which illustrates packets between service 220 and MN 230 in a session involving only second network 210. Path 235 is clearly longer than path 240, therefore packets following path 240 will generally take longer to get to their intended destinations. This may result in increased inefficiencies and cost.

Based on current network-based mobility management protocols, the MN currently does not know the amount of resources used; this depends on the mobility path and internal routing topology of the network(s), which is known only to the network operator. A simple timer generally will not work because the MN may not have moved very far, and too frequent re-assignments of addresses would cause too much overhead.

Network-initiated release of an address generally also will not work because only the MN is aware of which IP addresses it is still using, so the MN should be in control of when an unused address is released. After certain mobility events that cross domain boundaries, the network may be unable to redirect packets for old IP addresses to the new point of attachment. This condition should also be communicated to the MN quickly and efficiently.

According to an example embodiment, MNs make decisions about allocating new addresses and releasing old ones. Typically, only MNs have information about which addresses are still in use by applications executing in the MNs or which addresses have been registered with other entities such as name servers.

According to an example embodiment, a mechanism is provided to inform MNs (after a mobility event) which of its pre-existing prefixes are servable over a new connection. The MN may also be informed, for each servable prefix, a measure of cost (e.g., an amount of resources) expended to make the servable prefix routable over the new connection.

According to an example embodiment, information related to prefixes that are servable over the new connection is conveyed to the MN. Furthermore, a measure of cost for each prefix or advertised prefix is also conveyed. The prefixes may be single addresses explicitly assigned with dynamic host configuration protocol (DHCP). The addresses may be explicitly released by the MN or implicitly released when DHCP leases expire. The prefixes may also be delegated with DHCP-prefix delegation (DHCP-PD).

According to an example embodiment, the information about the prefixes that are servable over the new connection (as well as the measure of cost) are conveyed using DHCP, router advertisement (RA), or a new message.

According to an example embodiment, RAs are extended to carry information about the prefixes that are routable over the new connection and the measure of cost for the prefixes. Any prefixes used by the MN that are not conveyed in the RA may be managed by MN initiated client-based mobility management. The MN may detect a link flap, but it should not re-run DHCP because of this. The DHCP state machine is independent of the link state.

Figure 3:
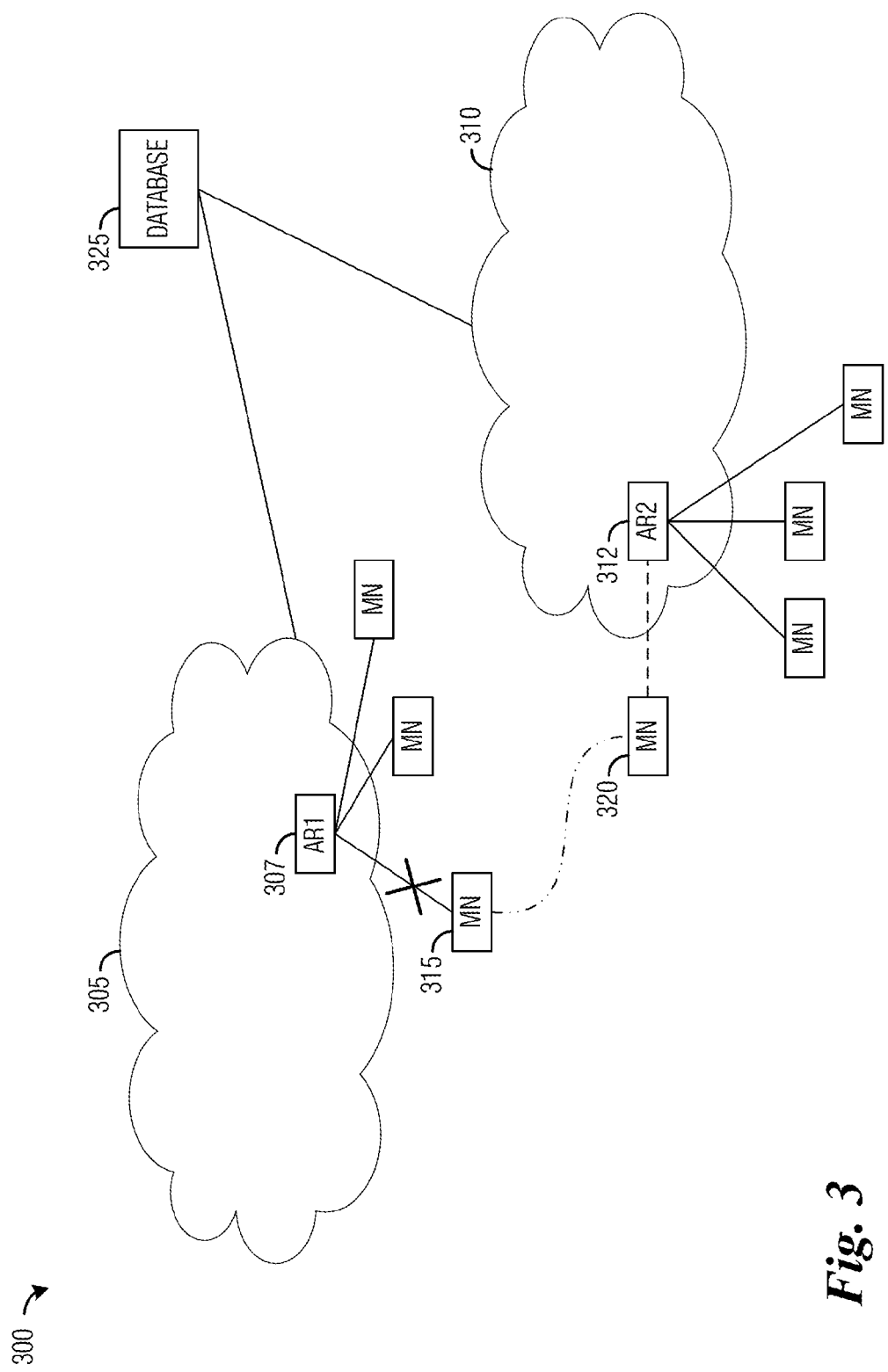
FIG. 3 illustrates an example communications system highlighting prefix management according to example embodiments described herein.

FIG. 3 illustrates an example communications system 300 highlighting prefix management. Communications system 300 includes a first network 305 and a second network 310. It is noted that networks 305 and 310 may be different parts of the same network. First network 305 includes an AR1

307, while second network 310 includes AR2 312. As shown in FIG. 3, a MN 315 is attached to first network 305 through AR1 307. A mobility event occurs when MN 315 detaches from AR1 307 and attaches to AR2 312, where it is shown as MN 320 to prevent confusion.

Upon MN 315 moving to AR2 312, the network(s) (including possibly the two routers) may take action to redirect one or more of prefixes assigned to MN 315 so that they are served by AR2 312, and an updated cost for each prefix is communicated to MN 315. Additionally, some prefixes from those prefixes assigned to MN 315 may not be servable by AR2 312, and this fact is communicated to MN 315 either explicitly or implicitly. MN 315 may in some cases take actions to retain an address assigned to it even though the address is not servable by AR2 312 by initiating a client-based mobility protocol session such as Mobile IP, for example. Additionally, one or more new prefixes that are more local to AR2 312 and are of lower cost may be made available to MN 315. MN 315 may continually evaluate the current cost of each servable and/or non-servable prefix assigned to it and the benefit it is obtaining from the use of the prefix by applications. From time to time, MN 315 may release costly prefixes thereby removing them from the set of prefixes assigned to MN 315. From time to time, MN 315 may request the allocation of new prefixes for subsequent use by applications. A detailed description of example embodiments of this process is presented below.

Communications system 300 also includes a database 325. Database 325 may be used to maintain information about prefixes assigned to MNs. The information about the prefixes may be arranged on an MN basis, meaning that database 325 may separately maintain the information about the prefixes for each MN. Although shown in FIG. 3 as a centralized database, database 325 may be a distributed database. As an illustrative example, each network may maintain a distributed database for only the MNs that are connected to the network. As another illustrative example, each network may maintain a distributed database for only the MNs that are connected to the network or were formerly connected to the network. As another illustrative example, a distributed database may be maintained for regions of communications system 300 (e.g., a first distributed database may maintain information for networks in a first region, a second distributed database may maintain information for networks in a second region, and so on). As yet another illustrative example, a combination of centralized and distributed databases is implemented.

Database 325 may be queried and/or updated through messages exchanged with routers or other devices in the networks of communications system 300. As an illustrative example, when a MN leaves a network, the network may exchange messages with database 325 to remove prefixes assigned to the MN but no longer served by the network from database 325. As another illustrative example, when a MN attaches to a network and elects to have some pre-existing prefixes redirected to the network, the network may exchange messages with database 325 to update information about the redirected prefixes at database 325. As another illustrative example, the MN itself may update the database with its assigned prefixes.

Figure 4:
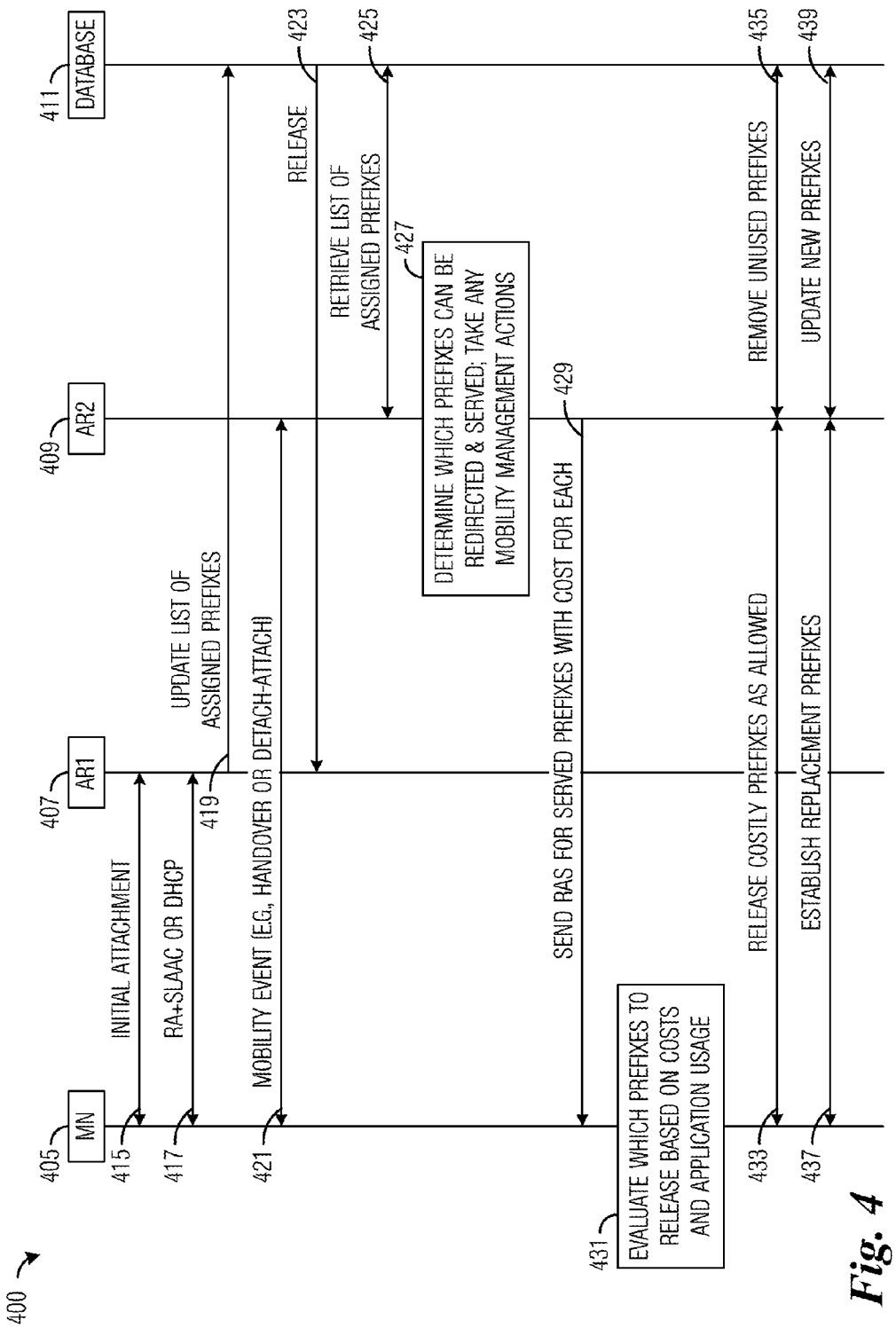
FIG. 4 illustrates a message exchange diagram of example messages and operations occurring in managing prefixes according to example embodiments described herein.

FIG. 4 illustrates a message exchange diagram 400 of example messages and operations occurring in managing prefixes. Message exchange diagram 400 includes messages exchanged by a MN 405, a first AR (AR1) 407, a second AR (AR2) 409, and a database 411. MN 405 may initially attach with AR1 407 (shown as event 415). As part of the initial attachment process, MN 405 may receive configuration information from AR1 407 by way of RA and stateless address auto-configuration (SLAAC) protocol messages or DHCP messages (shown as event 417). MN 405 may also establish sessions with services through AR1 407, and AR1 407 may provide information about prefixes of the sessions to database 411 (shown as event 419). As an illustrative example, AR1 407 may provide an identifier of MN 405 and a list of the prefixes to database 411.

A mobility event may occur (such as a handover, a detach-attach, and the like), where MN 405 leaves AR1 407 and attaches to AR2 409 (shown as event 421). As part of the mobility event, AR1 407 may be released by database 411 (shown as event 423). Releasing AR1 407 may prevent AR1 407 from further updating information related to MN 405 at database 411, while giving AR2 409 ability to do so, for example. AR2 409 may retrieve a list of prefixes assigned to MN 405 from database 411 (shown as event 425).

AR2 409 may determine which of the prefixes assigned to MN 405 may be served by AR2 409 (shown as block 427). The prefixes that may be served by AR2 409 may be referred to as servable prefixes. AR2 409 may also determine a measure of cost for each of the servable prefixes. As an illustrative example, the measure of cost for a servable prefix may be an amount of resource necessary to redirect a servable prefix. As another illustrative example, the measure of cost for a servable prefix may be an amount of resources necessary to support the servable prefix unchanged from its current configuration. AR2 409 may send a RA that includes information about the servable prefixes and the measures of cost to MN 405 (shown as event 429).

MN 405 may use the information about the servable prefixes and the measures of cost to evaluate which prefixes to keep and which prefixes to release (block 431). The evaluation of which prefixes to keep and which prefixes to release may be in accordance with the measures of cost. As an illustrative example, if the measures of cost convey the cost of redirecting the servable prefixes, MN 405 may select the servable prefixes with lowest cost. As an illustrative example, MN 405 may compare the measures of cost with a cost threshold and the servable prefixes that meet the cost threshold will not be kept.

According to an example embodiment, in addition to the measure of cost, MN 405 may consider application usage of the servable prefixes in the evaluation. As an illustrative example, if a servable prefix is no longer being used by an application on MN 405, MN 405 may elect to discard the servable prefix rather than maintaining it. As another illustrative example, if a servable prefix is used by an application that cannot move to a different address, MN 405 may be forced to maintain the servable prefix.

MN 405 may release servable prefixes and exchange messages with AR2 409 to release the servable prefixes (shown as event 433). AR2 409 may remove information about the released prefixes at database 411 (shown as event 435). MN 405 may establish replacement prefixes for those that were released (shown as event 437). MN 405 may also take action to retain the prefixes that were not servable by AR2 409. As an example, MN 405 may establish new mobile IP sessions to continue using the prefixes not directly servable by AR2 409. AR2 409 may update new prefixes at database 411 by sending information about the new prefixes to database 411 (shown as event 439). It is noted that replacement prefixes may be established prior to releasing the previous prefixes to minimize the disruption to ongoing communications.

Figures 5, 6:
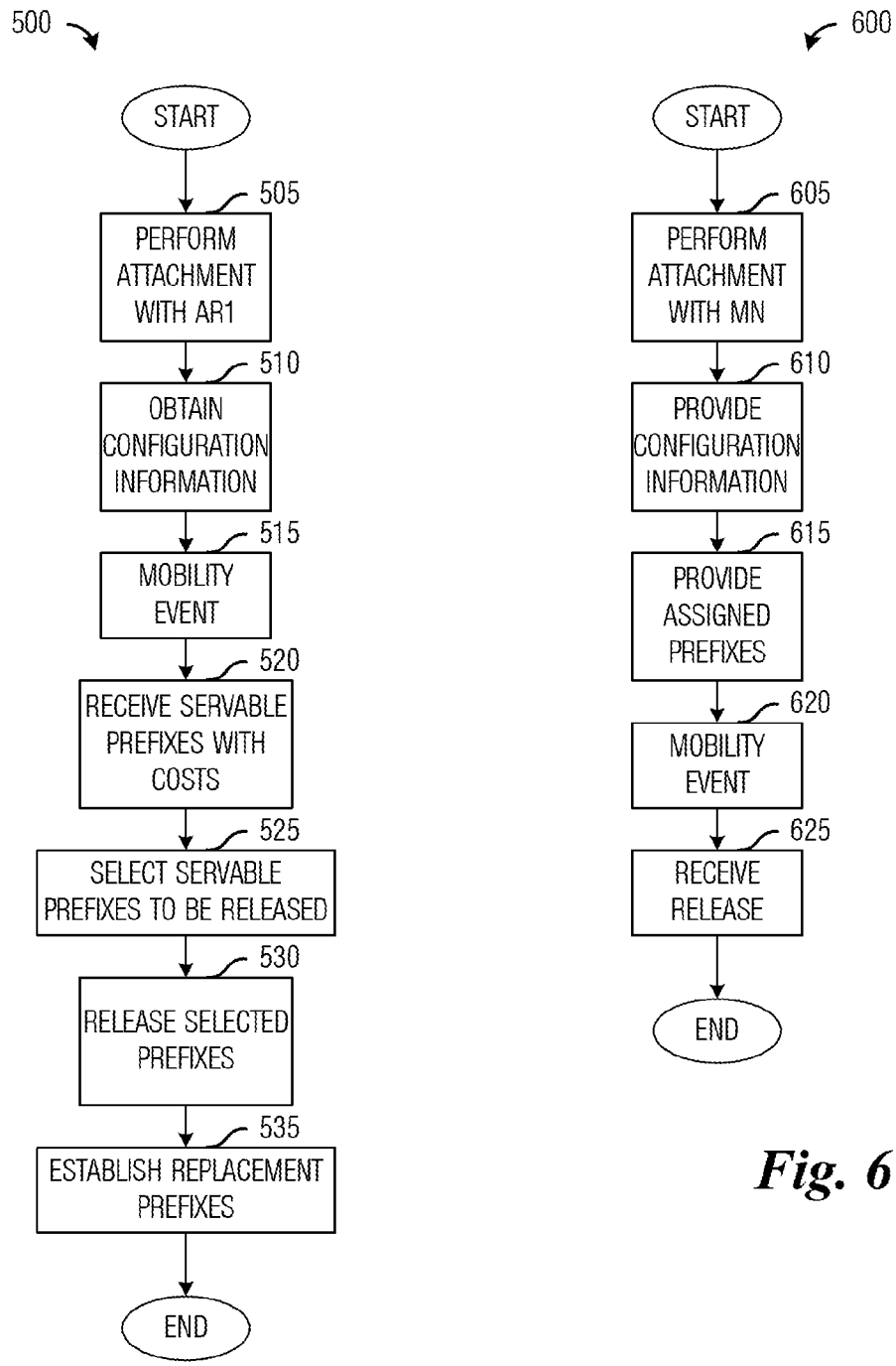
FIG. 5 illustrates a flow diagram of example operations occurring in a MN participating in prefix management according to example embodiments described herein.
FIG. 6 illustrates a flow diagram of example operations occurring in a first AR participating in prefix management according to example embodiments described herein.

FIG. 5 illustrates a flow diagram of example operations 500 occurring in a MN participating in prefix management.

Operations 500 may be indicative of operations occurring in a MN, such as MN 405, as the MN participates in prefix management.

Operations 500 may begin with the MN attaching to a first AR (block 505). As part of the attaching process, the MN may obtain configuration information from the first AR (block 510). While operating, the MN participates in a mobility event, such as a detach-attach, a handover, and the like (block 515). As a result of the mobility event, the MN becomes attached to a second AR. However, the MN may have pre-existing prefixes with the first AR. The MN may receive information about servable prefixes (its assigned prefixes that are servable by the second AR) and measures of cost for the servable prefixes (block 520). If the measures of costs are not available to the MN, the MN may potentially infer the cost through heuristic mechanisms. As an illustrative example, the MN may measure increased end-to-end latency after the mobility event and attribute increased latency to a longer end-to-end path. As another alternative example, the MN may count mobility events or maintain a timer in an attempt to guess which older prefixes are more costly and are candidates for being released. The MN may evaluate the servable prefixes in accordance with the measures of cost (block 525). In addition to the measures of cost, the MN may also utilize application usage in the evaluation of the servable prefixes. A result of the evaluation of the servable prefixes is a selection of prefixes that the MN has determined to release. Some of the prefixes that have been selected for releasing may be replaced, while others may not be replaced. As an example, the MN may determine that it has one or more prefixes that it is no longer using, therefore, the MN may release the prefixes without replacing them. The MN may release the selected prefixes (block 530). The MN may establish replacement prefixes for a subset of those that were released (block 535).

If there was one or more prefixes assigned to the MN that are not servable by the second AR (unservable prefixes), the MN may also take action to retain the unservable prefixes such as the establishment of a client-based Mobile IP session. According to an example embodiment, the unservable prefixes are explicitly signaled to the MN along with the servable prefixes and the measures of cost. According to an alternate example embodiment, the unservable prefixes are implicitly signaled to the MN. As an illustrative example, if the MN has 10 assigned prefixes and the second AR sends a list of 8 servable prefixes, the MN may be able to determine that the 2 remaining prefixes that are not in the list of servable prefixes are unservable prefixes.

FIG. 6 illustrates a flow diagram of example operations 600 occurring in a first AR participating in prefix management. Operations 600 may be indicative of operations occurring in a first AR, such as AR1 407, as the first AR participates in prefix management.

Operations 600 may begin with the first AR performing an attachment with a MN (block 605). As part of the attachment, the first AR may provide configuration information to the MN (block 610). As an illustrative example, the configuration information may be provided through RA and SLAAC messages or DHCP messages. The first AR may provide information about prefixes assigned to the MN to a database (block 615). The first AR may participate in a mobility event (block 620). The first AR may receive a release message (block 625).

Figures 7, 8:
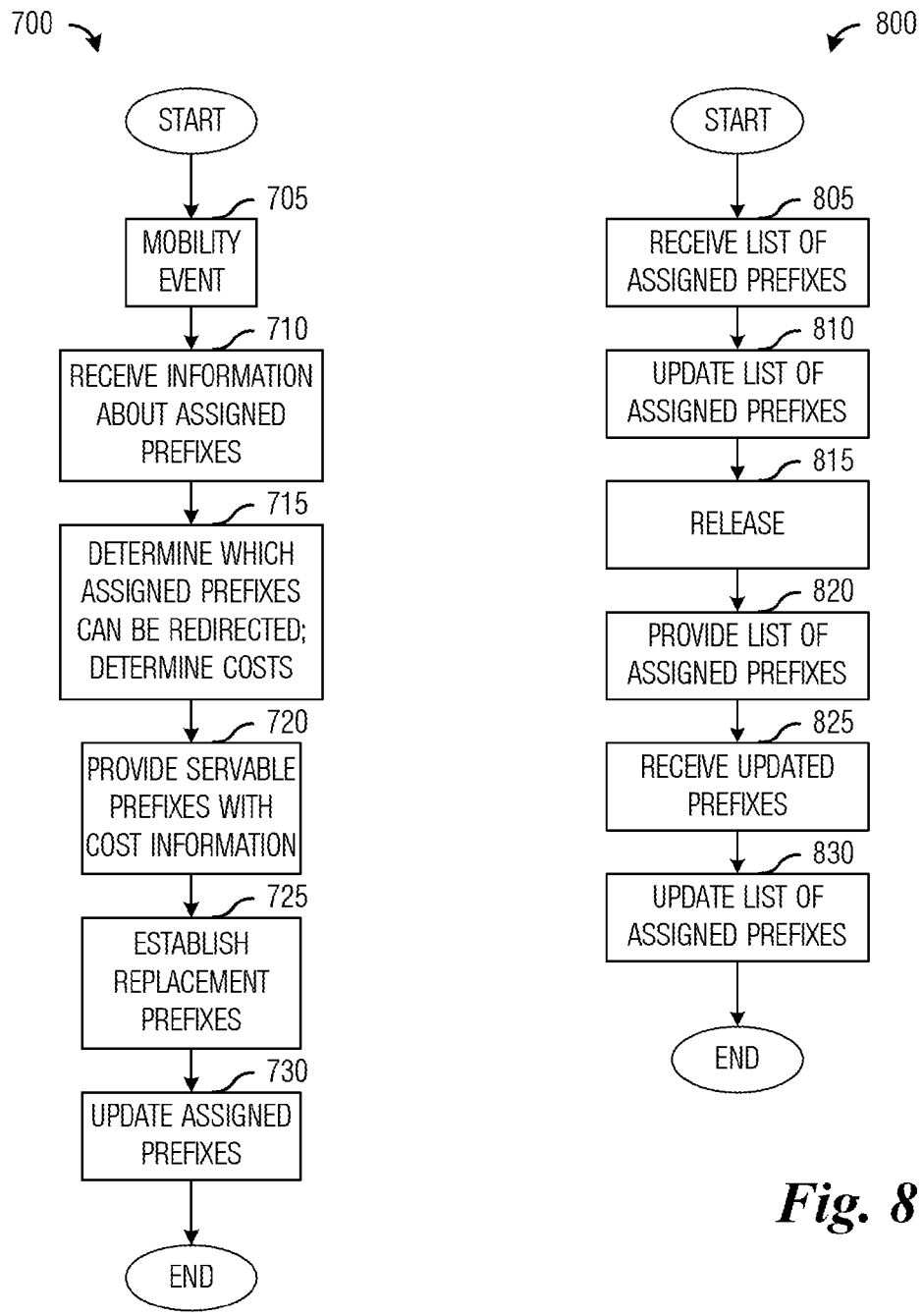
FIG. 7 illustrates a flow diagram of example operations occurring in a second AR participating in prefix management according to example embodiments described herein.
FIG. 8 illustrates a flow diagram of example operations occurring in a database participating in prefix management according to example embodiments described herein.

FIG. 7 illustrates a flow diagram of example operations 700 occurring in a second AR participating in prefix management. Operations 700 may be indicative of operations occurring in a second AR, such as AR2 409, as the second AR participates in prefix management.

Operations 700 may begin with the second AR participating in a mobility event with a MN (block 705). A result of the mobility event may be the MN attaching to the second AR. The second AR may request and receive information about prefixes assigned to the MN (block 710). The information may be requested from a database. The second AR may determine which of the prefixes may be served, as well as measures of cost for the prefixes that may be served (block 715). The second AR may provide information about the servable prefixes and the measures of cost to the MN (block 720). The second AR may also provide information about unservable prefixes. The information about the unservable prefixes may be provided explicitly or implicitly, as described previously. The second AR may establish replacement prefixes for the servable prefixes that were released by the MN (block 725). The second AR may provide information about the replacement prefixes to the database (block 730).

FIG. 8 illustrates a flow diagram of example operations 800 occurring in a database participating in prefix management. Operations 800 may be indicative of operations occurring in a database, such as database 411, as the database participates in prefix management.

Operations 800 may begin with the database receiving a list of prefixes assigned to a MN (block 805). The database may update a list of prefixes assigned to the MN (block 810). If a MN has changed ARs, the database may release the MN's old AR and replace it with the MN's new AR (block 815). The database may receive a request for information regarding prefixes assigned to a MN. The database may provide the information (block 820). The database may receive updated prefixes (block 825). The database may update the list of prefixes assigned to the MN with the updated prefixes (block 830).

Figure 9:
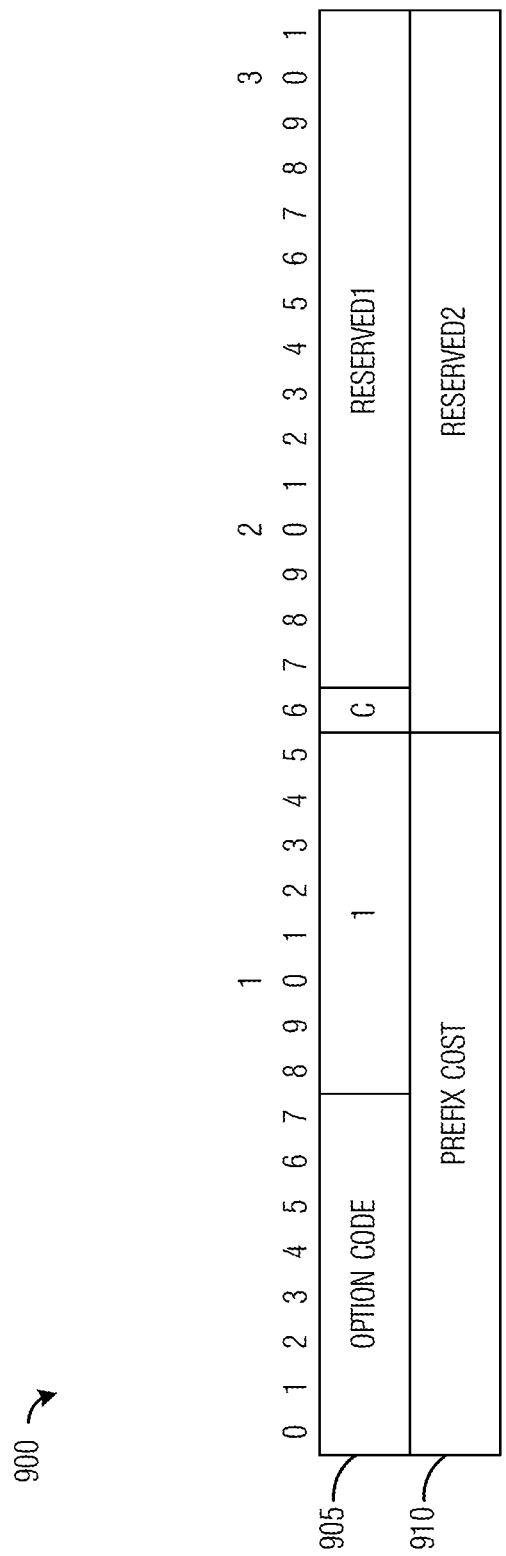
FIG. 9 illustrates an example format of a prefix cost option according to example embodiments described herein.

FIG. 9 illustrates an example format of a prefix cost option 900. Prefix cost option 900 may be transmitted between an AR to a MN to inform the MN of a servable prefix and its associated measure of cost. Prefix cost option 900 may include prefix code as indicated in an option code field 905. The prefix code indicates that the option is a prefix cost option. Prefix cost option 900 may also include a prefix cost value conveyed in a prefix cost field 910. Prefix cost field 910 may be a 16-bit field. The prefix cost value may be an unsigned number arranged in network byte order. A prefix cost option may be transmitted per prefix. Alternatively, a prefix cost option may include multiple prefix and associated prefix cost value pairs.

Figure 10:
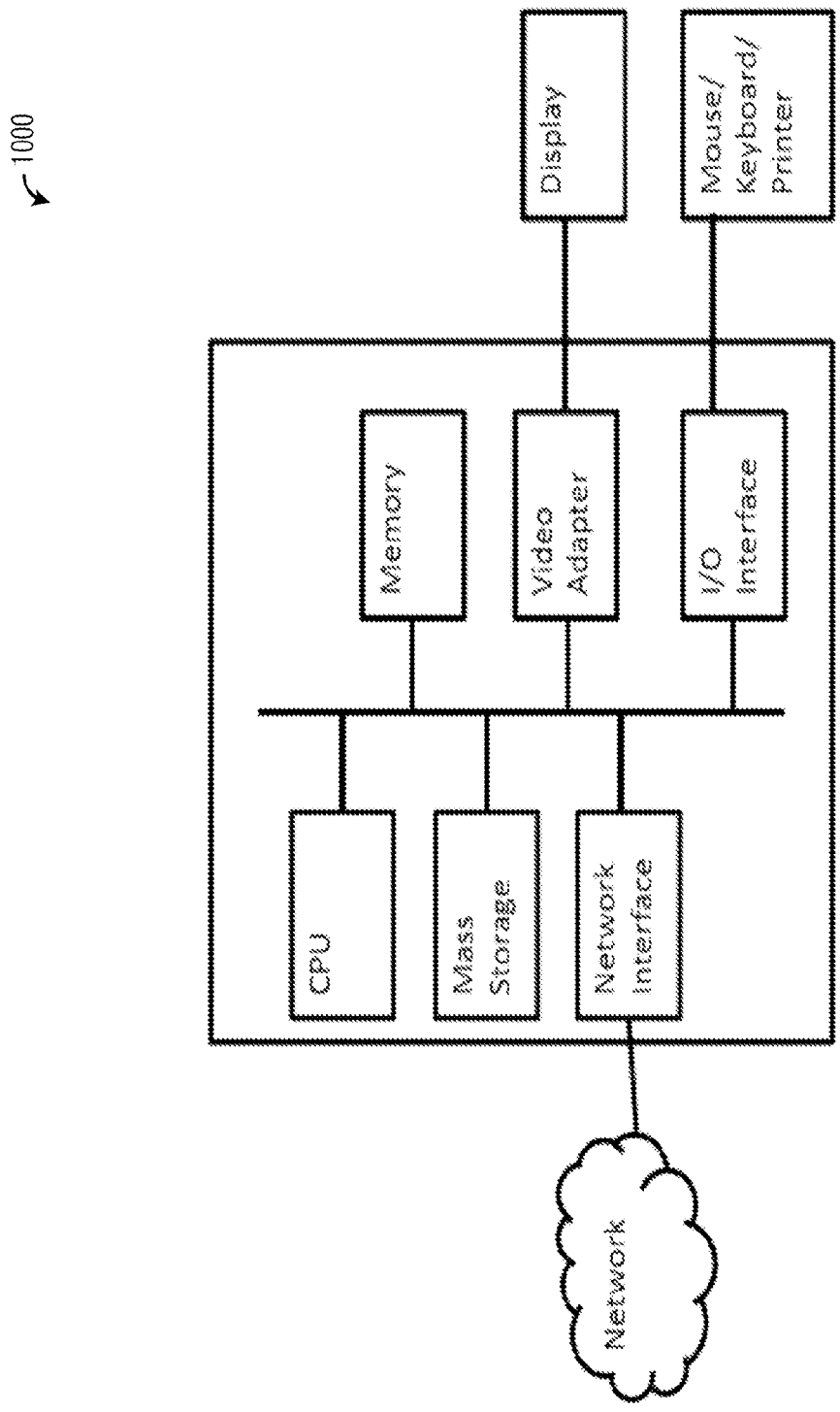
FIG. 10 is a block diagram of a processing system that may be used for implementing the devices and methods disclosed herein

FIG. 10 is a block diagram of a processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for managing prefixes of a mobile node (MN), the method comprising:
   receiving, by the MN, a servable prefix and a cost associated with the servable prefix from a first router serving the MN, wherein the servable prefix is one of a plurality of prefixes assigned to the MN that is servable by the first router, wherein the servable prefix has been retrieved from a distributed database, and wherein the distributed database comprises information about the prefixes arranged on an MN basis;
   deciding, by the MN, whether to release the servable prefix through the first router in accordance with the cost associated with the servable prefix; and
   releasing, by the MN, the servable prefix when the MN has decided to release the servable prefix.

2. The method of claim 1, further comprising establishing a replacement for the servable prefix upon deciding to release the servable prefix through the first router.

3. The method of claim 1, wherein the deciding is in accordance with usage of the servable prefix.

4. The method of claim 1, wherein the deciding is in accordance with usage of the servable prefix by an application executing in the MN.

5. The method of claim 1, wherein deciding whether to release the servable prefix through the first router comprises comparing the cost associated with the servable prefix with a cost threshold.

6. The method of claim 1, wherein the servable prefix and the cost associated with the servable prefix are received in a router advertisement.

7. The method of claim 1, further comprising participating in a mobility event.

8. The method of claim 7, wherein the MN is attached to a second router prior to participating in the mobility event.

9. The method of claim 8, wherein the first router is part of a first network and the second router is part of a second network.

10. The method of claim 7, wherein the mobility event comprises one of a handover, and a detach-attach procedure.

11. The method of claim 1, further comprising:
    receiving an unservable prefix from the first router, wherein the unservable prefix is one of the plurality of prefixes assigned to the MN that is not servable by the first router; and
    establishing a replacement for the unservable prefix.

12. The method of claim 11, wherein retaining use of the unservable prefix comprises establishing a client based mobile Internet Protocol session.

13. A method for managing prefixes of a mobile node (MN), the method comprising:
    retrieving, by a router from a distributed database, prefixes assigned to the MN, wherein the distributed database comprises information about the prefixes arranged on an MN basis;
    selecting, by the router, a first subset of the prefixes assigned to the MN that are servable by the router, thereby producing servable prefixes;
    determining, by the router, a cost measure for each of the servable prefixes, wherein the cost measure is an indication of resources used to maintain the servable prefix; and
    sending, by the router, the servable prefixes and the cost measures to the MN.

14. The method of claim 13, further comprising:
    establishing replacement prefixes for a subset of servable prefixes released by the MN.

15. The method of claim 14, further comprising:
    updating the prefixes assigned to the MN in accordance with the replacement prefixes.

16. The method of claim 13, wherein the prefixes assigned to the MN are retrieved from a database.

17. The method of claim 13, wherein the servable prefixes and the cost measures are sent in a router advertisement.

18. The method of claim 13, further comprising:
    selecting a second subset of the prefixes assigned to the MN that are not servable by the router, thereby producing unservable prefixes; and
    sending the unservable prefixes to the MN.

19. A mobile node (MN) adapted to perform prefix management, the MN comprising:
    a processor; and
    a non-transitory computer readable storage medium storing programming for execution by the processor, the programming including instructions to:
        receive a servable prefix and a cost associated with the servable prefix from a router serving the MN, wherein the servable prefix is one of a plurality of prefixes assigned to the MN that is servable by the router, wherein the servable prefix has been retrieved from a distributed database, and wherein the distributed database comprises information about the prefixes arranged on an MN basis, decide whether to release the servable prefix through the router in accordance with the cost associated with the servable prefix, and release the servable prefix when the MN has decided to release the servable prefix.

20. The MN of claim 19, wherein the programming includes instructions to establish a replacement for the servable prefix upon deciding to release the servable prefix.

21. The MN of claim 19, wherein the programming includes instructions to decide whether to release the servable prefix through the router in accordance with usage of the servable prefix.

22. The MN of claim 19, wherein the programming includes instructions to compare the cost associated with the servable prefix with a cost threshold.

23. A router adapted to perform prefix management, the router comprising:

a processor; and a non-transitory computer readable storage medium storing programming for execution by the processor, the programming including instructions to:

retrieve, from a distributed database, prefixes assigned to a mobile node (MN) wherein the distributed database comprises information about the prefixes arranged on an MN basis, select a subset of the prefixes assigned to the MN that are servable by the router, thereby producing servable prefixes, determine a cost measure for each of the servable prefixes, wherein the cost measure is an indication of resources used to maintain the servable prefix, and send the servable prefixes and the cost measures to the MN.

24. The router of claim 23, wherein the programming includes instructions to establish replacement prefixes for a subset of servable prefixes released by the MN.

25. The router of claim 24, wherein the programming includes instructions to update the prefixes assigned to the MN in accordance with the replacement prefixes.

\* \* \* \* \*